United States Patent [19]
Kawada

[11] Patent Number: 5,515,070
[45] Date of Patent: May 7, 1996

[54] COMBINED DISPLAY AND VIEWING SYSTEM

[75] Inventor: Masakazu Kawada, Tokyo, Japan

[73] Assignee: U.S. Philips Corporation, New York, N.Y.

[21] Appl. No.: 372,698

[22] Filed: Jan. 13, 1995

Related U.S. Application Data

[63] Continuation of Ser. No. 98,670, Jul. 23, 1993, abandoned.

[30] Foreign Application Priority Data

Jul. 24, 1992 [JP] Japan .................................. 4-218281

[51] Int. Cl.⁶ .................................................. G09G 5/00
[52] U.S. Cl. ............................................... 345/8; 345/7
[58] Field of Search .................................. 345/4, 7, 8, 9; 359/13, 630, 631, 633; 354/219, 289.11, 289.12; 348/333, 341, 345

[56] References Cited

U.S. PATENT DOCUMENTS

| | | | |
|---|---|---|---|
| 4,830,464 | 5/1989 | Cheysson | 345/8 |
| 5,252,950 | 10/1993 | Saunders | 345/9 |
| 5,257,094 | 10/1993 | LaRussa | 359/13 |

*Primary Examiner*—Richard Hjerpe
*Assistant Examiner*—Kent Chang
*Attorney, Agent, or Firm*—Edward W. Goodman

[57] ABSTRACT

A combined display and viewing system includes a display panel (6) and an optical subsystem (7,8) having at least one optical element (7) with a rear surface (7) which reflects the displayed information towards the eyes (E) of a user, wherein the focal length (f) of the subsystem satisfies the condition:

$-0.0005 \leq (1/f) < 0.0005$ mm$^{-1}$.

2 Claims, 3 Drawing Sheets

COMBINED DISPLAY AND VIEWING SYSTEM

This is a continuation of application Ser. No. 08/098,670, filed Jul. 23, 1993, now abandoned.

BACKGROUND OF THE INVENTION

1. Field of the Invention

The invention relates to a combined display and viewing system. Such system is able to simultaneously recognize background and display information without considerably changing a line of sight.

When using a video camera, it is desirable to have an indication of the elapsed recording time, the remaining capacity of a battery and the like, when viewing the scene to be filmed.

Further, in a case where a measuring operation using measuring instruments such as an oscilloscope, a tester and the like is carried out, it is desirable to look at both the measuring results, such as waveforms, and the measuring site simultaneously.

The elapsed shooting time, the remaining capacity of the battery and the like, or, the measuring results (hereinafter referred to as "display information") can be displayed by an LCD or the like.

For example, a video camera may be provided with a videotape drive section for performing driving of a video tape, a camera section for photographing a subject (background) and a finder section for displaying information such as elapsed shooting time, remaining capacity of a battery camera parameters when photographing.

In recent years, these sections have become small-sized and lightweight, and a video camera wherein these sections are integrated has been widespread.

When such video camera is used, a body of the video camera which contains the various sections is arranged in the vicinity of the face of the user. The camera section is directed to the subject, and the user's line of sight is directed to a finder section such that the user can see the subject or scene and the display information.

The display information together with the scene caught by the camera section is viewed via the finder section when the user directs his line of sight to the finder.

When a measuring instrument is used, it was up to now necessary that the user's line of sight is moved from a measuring position to display means for determining the measuring results. This is because it is in practice difficult to arrange the display means (body of the measuring instrument) at a location adjacent to the measuring position. In case where the measuring position is changed frequently, movement of the line of sight is frequently repeated.

For a smooth operation, it is necessary to have an arrangement which enables the user to view simultaneously the measuring site and the displayed measuring results.

In the case a video camera with a zoom lens set in the telephoto position to shoot an object which is fast moving, the subject may easily escape from the finder section. It is difficult then to catch again the object because of the limited field of view in the telephoto position. Then it becomes necessary to set the zoom lens in the wide-angle position, and to retract the eyes from the finder section in order to view the object directly, by visual observation and to determine the direction of a line of sight towards the object. For such operation, the user has to use his/her hands and hand-free operation is not possible. When the camera body needs to be held close to the user's eye for a long period of time, the user's hands become fatigued.

2. Description of the Related Art

Video camera's with a finder section separated from the video camera body so that the camera body need not to be located adjacent to the face of the user are known from a.o.

Japanese Patent Laid-open No. HEI 1-276973 (reference (1)),

Japanese Patent Laid-open No. HEI 2-121576 (reference (2)),

Japanese Patent Laid-open No. HEI 2-250567 (reference (3)), and

U.S. Pat. No. 4,672,436 (reference (4)). These references disclose arrangements wherein the finder section (Viewfinder) is provided on an auxiliary element. The auxiliary element is of spectacle type or substantially of headgear type and is to be mounted on a user's head. When the auxiliary element is mounted on the head, the finder section is arranged before the eyes of the user.

In the arrangements of references (1) to (4), the body of the video camera needs no longer to be arranged adjacent to the user's face, to look into the finder. However, the body on which a camera section is provided is hand-held, and the optical axis of the camera should be changed in agreement with the motion of the subject, so that movement of the body is still required. When a fast moving subject is escaped, the operation to catch the subject again will be difficult.

In the field of measuring instruments, arrangements have been realized in which measuring results are made audible so that operation can be continued without movement of the line of sight from a measuring site. However, it takes time to generate the audible signal, so that rapid or fast operation cannot be realized. A further problem arises when the measuring instrument does not provide waveform data or simple numerical data or the like.

SUMMARY OF THE INVENTION

It is an object of the present invention to provide a combined viewing and display system which is capable of simultaneously viewing information displayed on a display panel and a scene wherein no considerable change of a line of sight is necessary.

The system according to the present invention is characterized in that it comprises an information display panel that is substantially transparent for the radiation from a scene to be viewed an optical subsystem being substantially transparent for said radiation comprising at least one element and having a front surface facing the scene and a rear surface facing the display panel which rear surface reflects the displayed information towards the eyes of a user holding means for holding the display panel and said rear surface at a location before the eyes of the user such that the distance between the rear surface and the display panel is substantially equal to half the radius of curvatures of the rear surface, and in that the focal length of the subsystem satisfies the condition:

$$-0.0005 \leq (1/f) \leq 0.0005 \text{ mm}^{-1}.$$

This system may be further characterized in that the optical subsystem comprises an additional optical element arranged between the rear surface of the first optical element and the display panel.

The holding means are intended to be mounted on the head of a user so that the reflecting surface and the display panel are arranged at a position before the eyes of the user. Then it is possible to view the information on the display panel superimposed on the scene to which the user directs his eyes.

BRIEF DESCRIPTION OF THE DRAWINGS

The invention will now be described with reference to the drawings, wherein.

DESCRIPTION OF THE PREFERRED EMBODIMENT

Figure 1:
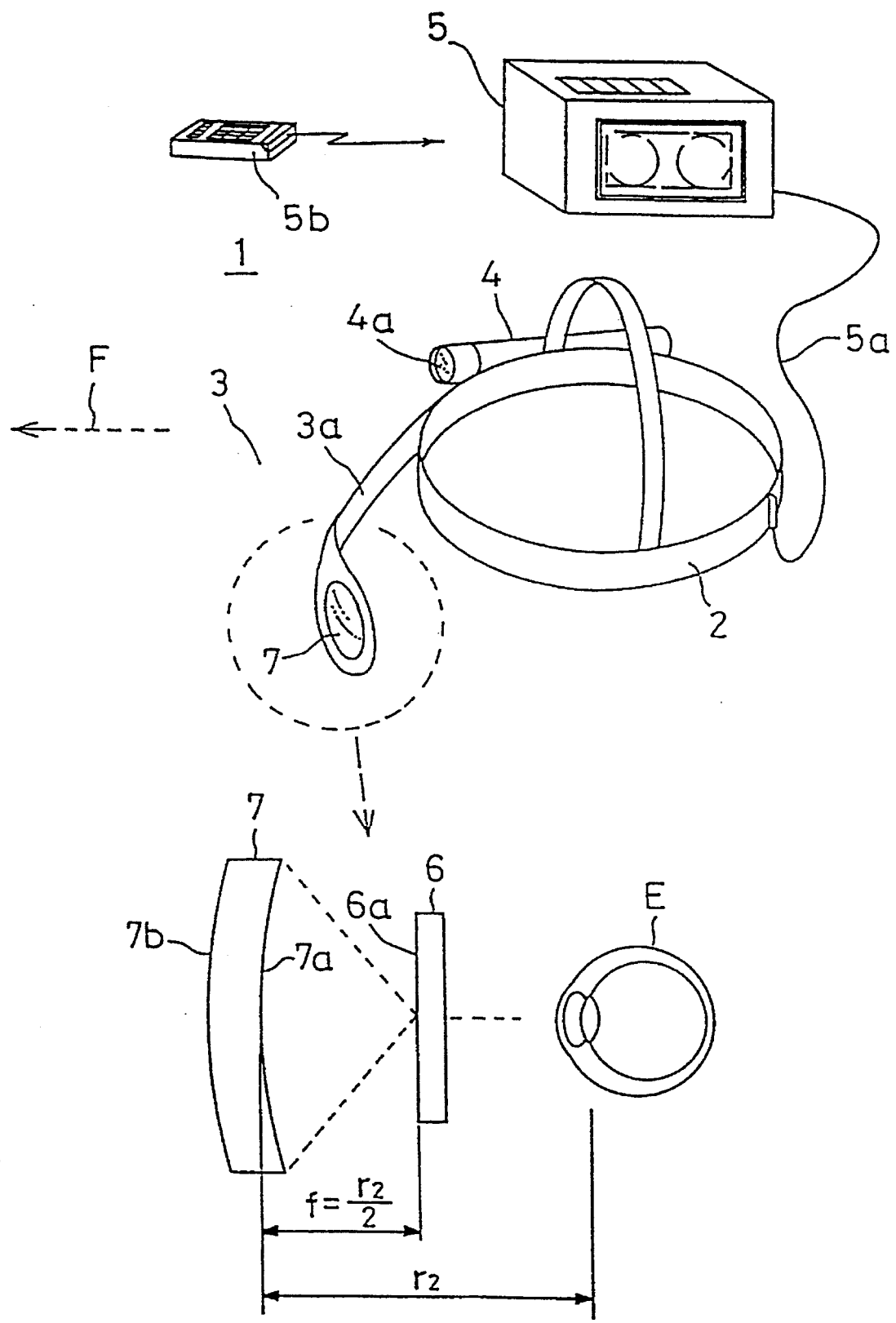
FIG. 1 shows a combined viewing and display system according to the invention.

FIG. 1 shows the application of the present invention for a video camera. The system 1 is provided with a holding element 2, a finder section 3 and a camera section 4 which are provided on the holding element 2. The holding element 2 is for example a belt which is to be worn on the head of a user, like a cap.

The finder section 3 comprises a curved optical element 7 that projects in a forward direction (the direction "F") from the holding element 2. This section accommodates a display panel 6 and a transparent element 7 having a rear surface 7a, and is fixed to the holding element 2 by the fixing element 3a.

The camera section 4 has a CCD, lenses and the like which are fixed to a side surface of the holding element 2. This section has an input side 4a into which an image of a scene is inputted.

The display panel 6 is mounted on the fixing element 3a with a surface 6a directed toward the front direction F and with a rear surface 6b directed toward the eyes E of the user. The display panel 6 is for example an LCD panel or the like which is transparent so that it transmits light from the scene and incident on surface 6a.

The curved optical element 7 is mounted on the fixing element 3a, its concave rear surface 7a directed toward the surface 6a of the display panel 6 and with a convex front surface 7b directed toward the front direction.

The rear surface 7a is covered with a coating which reflects the image displayed on the surface 6a of the display panel 6 and transmits the scene light incident via the front surface 7b.

Further the radii of curvature of the reflecting surface 7a and the front surface 7b are substantially chosen such that the element 7 has substantially no optical power. This condition is met if the radius of curvature $r_1$ of the front surface 7b, the radius of curvature $r_2$ of the rear surface 7a, the thickness d of the element 7, and the refractive index n of the element 7 satisfy the following equation:

$$r_1 = r_2 + (n-1)d/n \qquad (1)$$

This equation is derived as follows.
For the focal length f of the element 7 generally holds:

$$1/f = (n-1)(1/r_1 - 1/r_2) + d(n-1)^2/(n \ast r_1 \ast r_2) \qquad (2)$$

If the lens power of element 7 is zero the lef-hand member of the equation 2 should be zero. This leads to:

$$r_2 = r_1 - (n-1)d/n \qquad (3)$$

However the user looks at a scene or object not only via the optical element 7 but also via the display panel 6. Therefore according to the present invention the focal length $f_t$ of the system comprising the element 7 and the display panel 6 should satisfy the condition:

$$-0.0005 \leq (1/f_t) \leq 0.0005 \text{ mm}^{-1} \qquad (4)$$

Otherwise the object or scene as viewed via system 1 may be out of focus and not seen clearly.

In the ideal situation, the element 7 of the display system 1 satisfies the equation 1, provided that elements arranged in front of and in rear of the element 7, for example the display panel 6, have zero optical power. However, to cope with tolerances, in practice, equation (4) should be met.

Although in principle there is no limitation for the radius of curvature $r_2$, preferably this radius is limited to $$20 \text{ mm} \leq r_2 \leq 100 \text{ mm} \qquad (5)$$

If the radius of curvature $r_2$ is less than 20 mm, the distance between the rear surface 7a of the element 7 and the display surface 6a of the display panel 6 may become so short that the system is not feasible. If the radius of curvature $r_2$ exceeds 100 mm, the distance between the rear surface 7a and the display surface 6a may become so long, that miniaturization is not possible.

In designing element 7, first the radius of curvature $r_2$ is chosen, and then radius of curvature $r_1$ for which the equation 4 holds is determined. The information displayed on the display panel 6 and reflected by the reflecting surface 7a is conceived as an image located in front of (in the direction "F") the reflecting surface 7a. To that end the distance (focal length) "f" between the display panel 6 (surface 6a) and the optical element 7 (reflecting surface 7a) is preferably such that the following equation holds:

$$f = r_2/2 \qquad (7)$$

The focal length f is suitably changed (dioptor) adjustment) for a user who has symptoms such as myopia, hypermetropia or the like, so that the display information reflected from the reflecting surface 7a is clearly perceptible. The dioptor adjustment is realized by a mechanism mounted on the fixing element 3a for advancing and retracting the optical element 7 with respect to the display panel 6.

Japanese Patent Laid-Open No. HEI 1/295577 (reference (5)) and U.S. Pat. No. 4,874,214 (reference (6)) disclose the concept of a finder being arranged before the eyes, to view the scene to be photographed. In the device of reference (5), a color liquid crystal panel is imaged onto the concave mirror arranged before the eyes, and re-imaged at a location remote from such location in the present system. In the device of reference (6), an image projected onto a display panel arranged before the eyes is enlarged by a concave lens.

The body 5 of the video camera is electrically connected to the retaining member 2 by a cable 5a. The body 5 has a tape driving portion which accommodates the video tape and which performs recording of the tape. The cable 5a performs transmission of image information and display information between the finder section 3 and a camera section 4, and the body 5.

Figure 2:
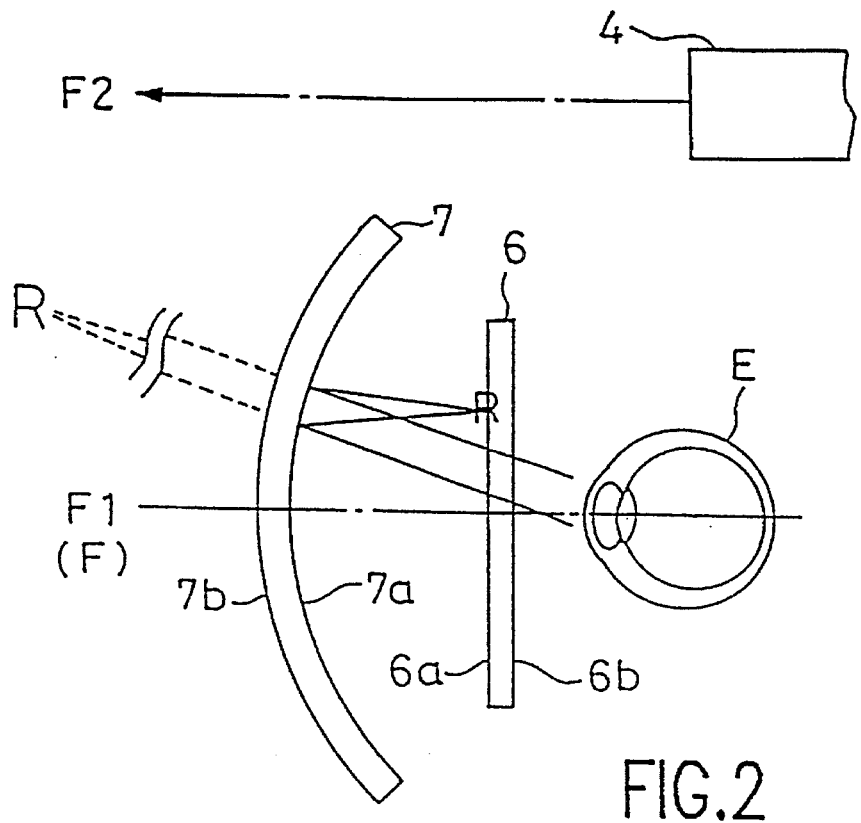
FIG. 2 illustrates the operational principle of the system.

FIG. 2 is a view for explanation of the operational principle of the display system 1 according to the invention.

In the display system 1 the line of sight of the eye "E" extends in the direction F1 and the display panel 6 and the optical device 7 are arranged behind each other in this direction. The input side 4a of the camera section 4 has its normal in a direction F2 parallel to the direction F1. The photographed scene is converted to image information at the camera section 4, and is transmitted to the body 5 through the cable 5a. The body 5 performs recording of the image information and, simultaneously, transmits the display information such as the elapsed time of photographing, the remaining capacity of the battery and the like to the finder section 3 through the cable 5a. The display panel 6 of the finder section 3 performs display of this information.

The displayed information is reflected by the reflecting surface 7a of the optical element 7, and is inputted to the eye E.

The displayed information is, for example, the elapsed time of photographing, the remaining capacity of the battery and information of the video-tape driving section, such as whether this is in a recording condition or in a reproducing condition and the like and, further, image information such as characters, marks or the like indicating a recording frame or the like specifying the subject (recording area) caught by the camera 4.

In the eye E, the display information reflected by the reflecting surface 7a is perceived as being an image at a position more remote from the eye than the reflecting surface 7a. The display panel 6 and the optical element 7 transmits the radiation from the subject or the scene which subject is also caught by the camera 4 to the eye E. When information is displayed on the display panel 6, the focal length of the eye E is changed so that both the scene and the displayed information can adequately be viewed.

Figure 3:
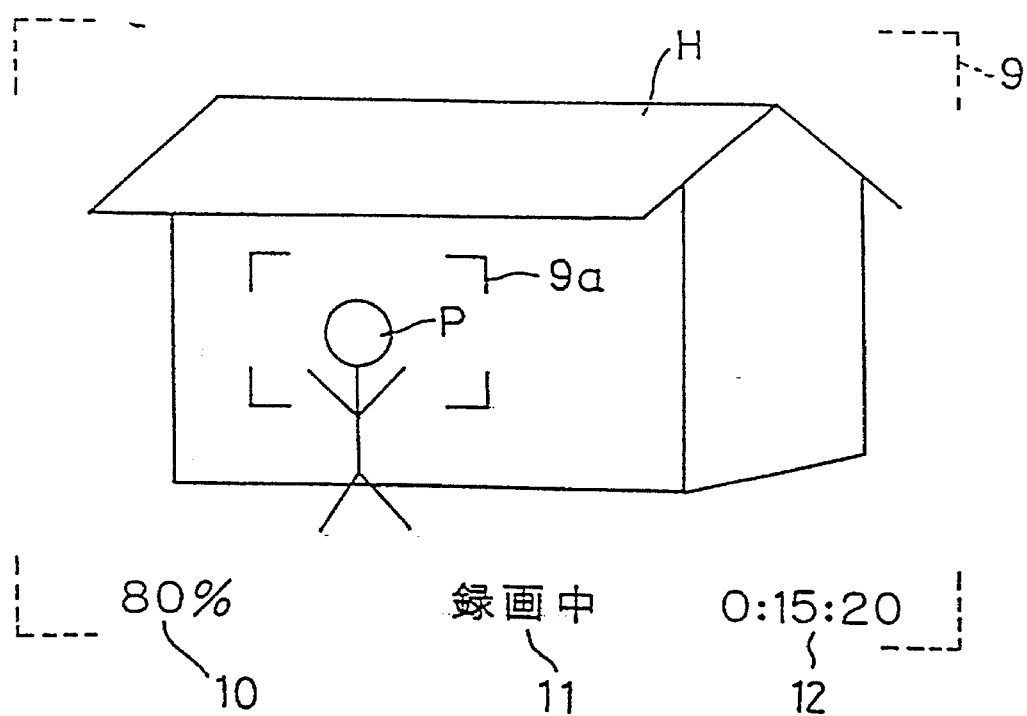
FIG. 3 shows an example of display information superposed on a scene as viewed through the reflecting surface.

FIG. 3 shows an example of the information seen by the eye through the reflecting surface 7a. The scene comprises a person P standing in front of a building H. The display information comprises an area frame 9 (9a) indicating a photographing area, display 10 for the remaining battery capacity, display 11 for driving status of the videotape driving section and display 12 for the elapsed time of photographing.

The area frame 9 indicates a case where a zoom lens is set in a wide-angle position while the area frame 9a indicates a case where the zoom lens is set in a telephoto position.

The battery remaining capacity, the driving status and the elapsed time of photographing are continuously displayed, respectively, on the constant positions. If the zoom lens is changed from the wide-angle position to the telephoto position, the area frame is reduced from the area frame 9 to the area frame 9a. In the reverse case, the area frame is enlarged.

The camera body 5 may be mounted on the back of the user by, for example, a belt or the like. By doing so, hand-free operation is perfectly possible.

Moreover, the driving of the body 5, zooming of the camera section 4 and the like may be remote-controlled, by a remote-control device 5b (FIG. 1). The remote-control device may be mounted on the user's body and utilized only when the operation of the body 5 is required, so that the time during which freedom of hands is taken away is confined to the minimum.

In a case where the present invention is applied to a measuring instrument, the body 5 illustrated in FIG. 1 corresponds to a body of the measuring instrument, and the camera section 4 corresponds to a probe. Of course, the probe is not fixed to the holding element 2, but is freely movable separate from the element 2. The display information (measuring results) projected onto the display panel 6 can be viewed while the line of sight of the user is kept to the measuring site.

Next, the change in the focal length in an embodiment wherein an optical system such as lenses or the like is arranged between the reflecting surface 7a and the display surface 6a of the panel 6 will be described with reference to FIGS. 4a and 4b.

Figure 4:
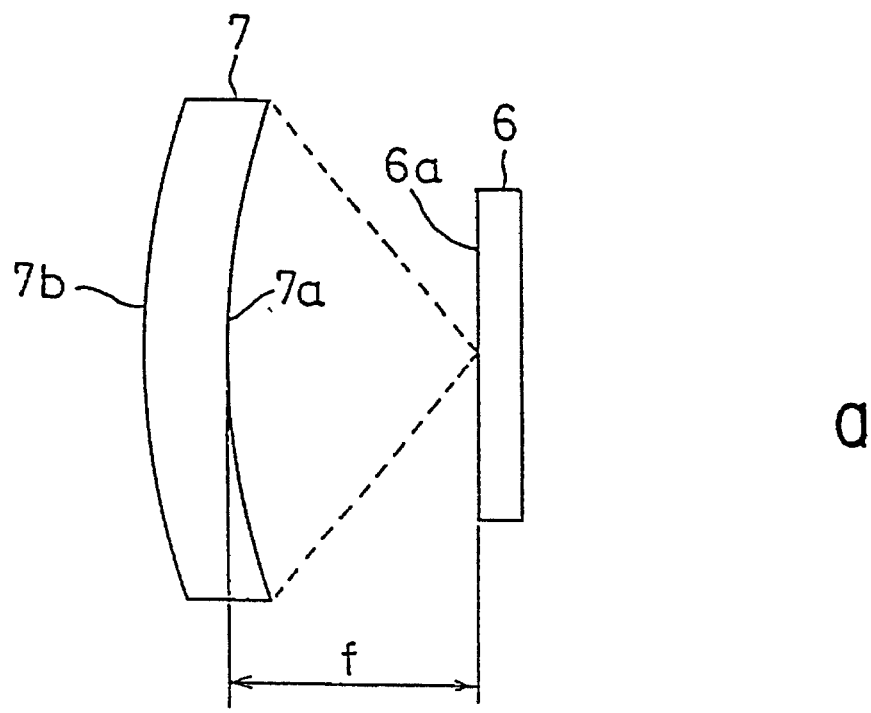
FIG. 4 illustrates which focal length should be chosen.
Figure 4:
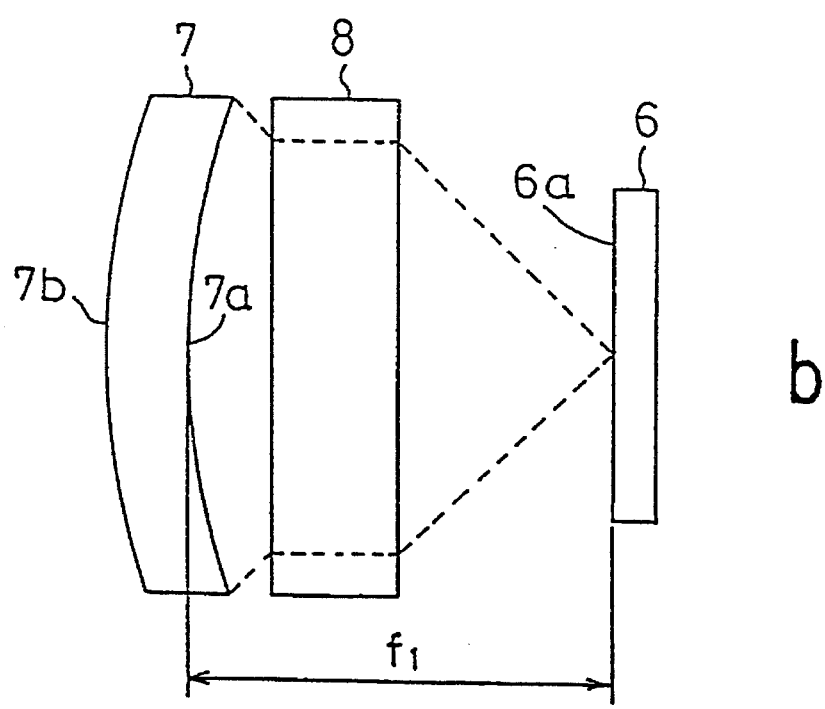

FIG. 4(a) shows the embodiment wherein the display panel 6 is directly arranged in front of the reflecting surface 7a as in FIG. 1 and FIG. 2. The space between the reflecting surface 7a and the display surface 6a is set to distance 'f' half the radius of curvature $r_2$ of the reflecting surface 7a.

FIG. 4(b) shows an embodiment in which an optical system 8 such as a glass plate or the like is arranged between the reflecting surface 7a and the display surface 6a. The focal length $f_t$ of the whole system is determined by the focal length of the reflecting surface 7a and the focal length of the optical system 8 and the distance between the reflecting surface 7a and the display surface 6a should be adapted to $f_t$. In equation 2 f should be replaced by $f_t$.

In the above described embodiment, the reflecting surface 7a has been described as being substantially transparent for the radiation from the scene. However, the reflecting surface 7a may also be a perfect reflecting surface. In that case the scene information should be displayed on panel 6. Surface 7a may also be a convex surface instead of a concave surface.

If the display information such as characters, marks and the like is displayed in an overlapped manner upon the scene entered along the line of sight of the user, the utilizing field and the apparatus arrangement are not particularly limited.

I claim:

1. A combined display and viewing system characterized in that said combined display and viewing system comprises:

an information display panel that is substantially transparent for light radiation from a scene to be viewed, and arranged on a system optical axis of said display and viewing system;

an optical subsystem being substantially transparent for said light radiation and having a single optical axis defining the system optical axis, said optical subsystem comprising at least one element having a curved front surface facing the scene and a rear surface facing the display panel, said rear surface exclusively reflecting information displayed on said display panel towards an eye of a user, said at least one element having, for scene radiation, substantially zero lens power;

holding means for holding the display panel and the optical subsystem at a location before the eye of the user with said display panel being disposed between the eye and said optical subsystem, wherein a distance between the rear surface of the element of the optical subsystem and the display panel is substantially equal to one-half of a radius of curvature of the rear surface, and wherein a focal length of the subsystem satisfies the condition:

$$-0.0005 \leq (1/f) \leq 0.0005 \text{ mm}^{-1}.$$

2. A combined display and viewing system as claimed in claim 1, characterized in that the optical subsystem comprises an additional optical element arranged between the rear surface of the first optical element and the display panel.

* * * * *